US012695086B2

(12) United States Patent
Kim et al.

(10) Patent No.: US 12,695,086 B2
(45) Date of Patent: Jul. 28, 2026

(54) CORE-SHELL-TYPE CATHODE ACTIVE MATERIAL FOR LITHIUM SECONDARY BATTERY, METHOD OF MANUFACTURING SAME, AND LITHIUM SECONDARY BATTERY INCLUDING SAME

(71) Applicant: The Industry & Academic Cooperation in Chungnam National University (IAC), Daejeon (KR)

(72) Inventors: Chunjoong Kim, Daejeon (KR); Duc Quang Nguyen, Daejeon (KR)

(73) Assignee: The Industry & Academic Cooperation in Chungnam National University (IAC), Daejeon (KR)

( * ) Notice: Subject to any disclaimer, the term of this patent is extended or adjusted under 35 U.S.C. 154(b) by 629 days.

(21) Appl. No.: 18/183,405

(22) Filed: Mar. 14, 2023

(65) Prior Publication Data

US 2024/0025761 A1      Jan. 25, 2024

(30) Foreign Application Priority Data

Jul. 25, 2022      (KR) ........................ 10-2022-0091826

(51) Int. Cl.
| | |
|---|---|
| *H01M 4/36* | (2006.01) |
| *C01G 53/42* | (2025.01) |
| *C01G 53/82* | (2025.01) |
| *H01M 10/052* | (2010.01) |

(52) U.S. Cl.
CPC ............ *H01M 4/366* (2013.01); *C01G 53/42* (2013.01); *C01G 53/82* (2025.01); *H01M 10/052* (2013.01); *C01P 2002/77* (2013.01); *C01P 2006/40* (2013.01)

(58) Field of Classification Search
CPC .................................................... H01M 4/525
See application file for complete search history.

(56) References Cited

U.S. PATENT DOCUMENTS

| | | | | | |
|---|---|---|---|---|---|
| 10,439,215 | B2 * | 10/2019 | Tan | ........................ | H01M 4/525 |
| 10,581,110 | B2 * | 3/2020 | Kwon | .................... | H01M 4/131 |
| 10,763,503 | B2 * | 9/2020 | Park | ...................... | H01M 4/366 |
| 11,870,068 | B2 * | 1/2024 | Lim | ...................... | H01M 4/485 |
| 12,206,105 | B2 * | 1/2025 | Guo | ................... | H01M 10/0525 |

FOREIGN PATENT DOCUMENTS

| | | | | | |
|---|---|---|---|---|---|
| CN | 108269971 | B | * | 9/2019 | ........ H01M 10/0525 |
| CN | 112652751 | A | * | 4/2021 | ............. C01G 53/82 |
| CN | 113314712 | A | | 8/2021 | |

(Continued)

OTHER PUBLICATIONS

Gang Li, et al."Effect of precursor structures on the electrochemical performance of Ni-rich $LiNi_{0.88}Co_{0.12}O_2$ cathode materials", Electrochimica Acto,2018, vol. 270, pp. 319-329 (11 pages).

(Continued)

*Primary Examiner* — Amanda C. Walke

(74) *Attorney, Agent, or Firm* — Sughrue Mion, PLLC

(57) ABSTRACT

Proposed is a lithium secondary battery cathode active material doped with B and Al. The cathode active material has a high specific capacity upon charging and discharging, a high capacity resilience, and a high capacity retention rate.

8 Claims, 10 Drawing Sheets

(56)            References Cited

FOREIGN PATENT DOCUMENTS

| | | | | | |
|---|---|---|---|---|---|
| CN | 116454224 A | * | 7/2023 | ............. | C01G 53/82 |
| CN | 116639735 A | * | 8/2023 | ............. | C01G 53/82 |
| CN | 117080397 A | * | 11/2023 | ............ | H01M 4/366 |
| EP | 3780174 A1 | | 2/2021 | | |
| KR | 10-2014-0139675 A | | 12/2014 | | |
| KR | 10-1583125 B1 | | 1/2016 | | |
| KR | 10-2020-0096549 A | | 8/2020 | | |
| KR | 10-2020-0145747 A | | 12/2020 | | |
| KR | 10-2021-0065831 A | | 6/2021 | | |
| KR | 10-2327052 B1 | | 11/2021 | | |

OTHER PUBLICATIONS

Korean Office Action dated Nov. 1, 2024 in Application No. 10-2022-0091826.

* cited by examiner

Distance from particle edge (nm)

Distance from particle edge (nm)

CORE-SHELL-TYPE CATHODE ACTIVE MATERIAL FOR LITHIUM SECONDARY BATTERY, METHOD OF MANUFACTURING SAME, AND LITHIUM SECONDARY BATTERY INCLUDING SAME

CROSS REFERENCE TO RELATED APPLICATION

The present application claims priority to Korean Patent Application No. 10-2022-0091826, filed on Jul. 25, 2022, the entire contents of which is incorporated herein for all purposes by this reference.

BACKGROUND OF THE DISCLOSURE

1. Field of the Disclosure

The present disclosure relates to a core-shell structured cathode active material for a lithium secondary battery, a method of preparing the same material, and a lithium secondary battery including the same material.

2. Description of the Related Art

At the present, the demand for electric vehicles is explosively increasing, and the demand for increasing the mileage is also growing. In order to meet such market conditions, the industry around the world is developing secondary batteries having high capacity and high energy density.

The most promising candidate to satisfy these demands is a high-nickel type cathode active material that has been proven to increase capacity and energy density, but the problem is that nickel is the cause of various side reactions occurring in the cathode active material. Specifically, $Ni^{3+}$ (nickel trivalent ion) is chemically very unstable and has a strong tendency to be reduced to $Ni^{2+}$ (nickel divalent ion). $Ni^{2+}$ has an ionic radius similar to that of $Li^+$. For this reason, a cation mixing phenomenon occurs in which $Li^+$ in the lattice structure is replaced with $Ni^{2+}$ and $Ni^{2+}$ pushes $Li^+$ outward, i.e., toward the surface. As a result, NiO, which acts as a strong resistance component, is formed on the surface of the cathode active material.

The present disclosure is intended to propose a high-nickel cathode active material in which Ni3+ ions are stabilized by doping and a core-shell structure and to propose a lithium secondary battery having increased capacity and energy density by employing the nigh-nickel cathode active material.

LITERATURE OF RELATED ART

Patent Literature (Patent Literature 1) (0001) Korean Patent Application Publication No. 10-2020-0096549 (Aug. 12, 2020)
(Patent Literature 2) (0002) Korean Patent No. 10-1583125 (Dec. 30, 2015)
(Patent Literature 3) (0003) Korean Patent No. 10-2327052 (Nov. 10, 2021)

SUMMARY OF THE DISCLOSURE

In order to solve the above problems, an objective of the present disclosure is to provide a core-shell structured cathode active material doped with boron (B) and aluminum (Al) for a lithium secondary battery.

In order to accomplish the objective, the present disclosure provides a cathode active material precursor for a lithium secondary battery, the cathode active material having a core-shell structure that satisfies Formula 1 below and includes a plurality of particles.

$$Ni_xCo_{1-x}(OH)_2 \qquad \text{[Formula 1]}$$

Here, x is a real number satisfying a condition of $0.8 \leq x \leq 1.0$.

The cathode active material precursor may have a core having a composition of $Ni(OH)_2$.

In addition, the present disclosure provides a core-shell structured cathode active material for a lithium secondary battery. The cathode active material is prepared from the cathode active material precursor and is doped with an element in Group 13. The cathode active material includes a core satisfying Formula 2 below and a shell satisfying Formula 3 below, when the element of Group 13 is eliminated from the formula thereof. The cathode active material has a nickel content of 15 to 25 mole %.

$$LiNi_xCo_{1-x}O_2 \text{ (where, } x \text{ is a real number satisfying } 0.9 \leq x \leq 1.0.) \qquad \text{[Formula 2]}$$

$$LiNi_xCo_{1-x}O_2 \text{ (where, } x \text{ is a real number satisfying } 0.8 \leq x \leq 0.9.) \qquad \text{[Formula 3]}$$

The cathode active material for a lithium secondary battery may have a trigonal crystal structure.

The element in Group 13 may be one or more selected from B, Al, Ga, and In. In this case, preferably, the element may be B and Al among the Group 13.

B may be present in a molar ratio in a range of 1:0.005 to with respect to lithium and Al may be present in a molar ratio in a range of 1:0.010 to 0.020 with respect to lithium.

The core-shell structured cathode active material for a lithium secondary battery may have a shell thickness of 300 to 1000 nm.

The cathode active material may have a $Ni^{3+}$ concentration of 85% or more at a position having a radial depth of 100 nm or more from the surface of the core-shell structure.

A method for producing a cathode active material for a lithium secondary battery having a core-shell structure includes: A) preparing a first solution by mixing a nickel salt compound and an aqueous ammonia solution; B) obtaining nickel hydroxide by adding a basic aqueous solution to the first solution; C) preparing a second solution in which a nickel salt compound and a cobalt salt compound are dissolved, D) preparing a cathode active material precursor for a lithium secondary battery by adding the nickel hydroxide to the second solution; E) preparing a mixed powder by mixing the cathode active material precursor, lithium hydroxide, and a dopant; and F) heat-treating the mixed powder.

The B) step may include a step of drying the nickel hydroxide.

The D) step may include a step of drying the cathode active material precursor.

The nickel salt compound may be any one selected from sulfate, nitrate, and phosphate.

The basic aqueous solution may be a mixed aqueous solution prepared by mixing sodium hydroxide and ammonia. The concentration of sodium hydroxide and ammonia may be in a range of 3 M to 6 M.

The cobalt salt compound may be any one selected from sulfate, nitrate, and phosphate.

The dopant may include one or more selected from B, Al, Ga, and In.

The heat-treating may be performed at a temperature in a range of 300° C. to 500° C. for a duration in a range of 1 hour to 4 hours. After the heating treating, a secondary heat treatment may be performed for a duration in a range of 8 hours to 20 hours at an elevated temperature in a range of 600° C. to 900° C.

The present disclosure may include a lithium secondary battery cathode including the cathode active material or may include a lithium secondary battery including the lithium secondary battery cathode.

A cathode active material for a lithium secondary battery, according to the present disclosure, has a core-shell structure doped with B and Al. In the cathode active material, $Ni^{3+}$ is maintained at a high concentration. For this reason, it is possible to prevent cation mixing, enables high rate charging and discharging, improves capacity recovery capability, and increases battery life.

DESCRIPTION OF THE PREFERRED EMBODIMENTS

Figure 1A:
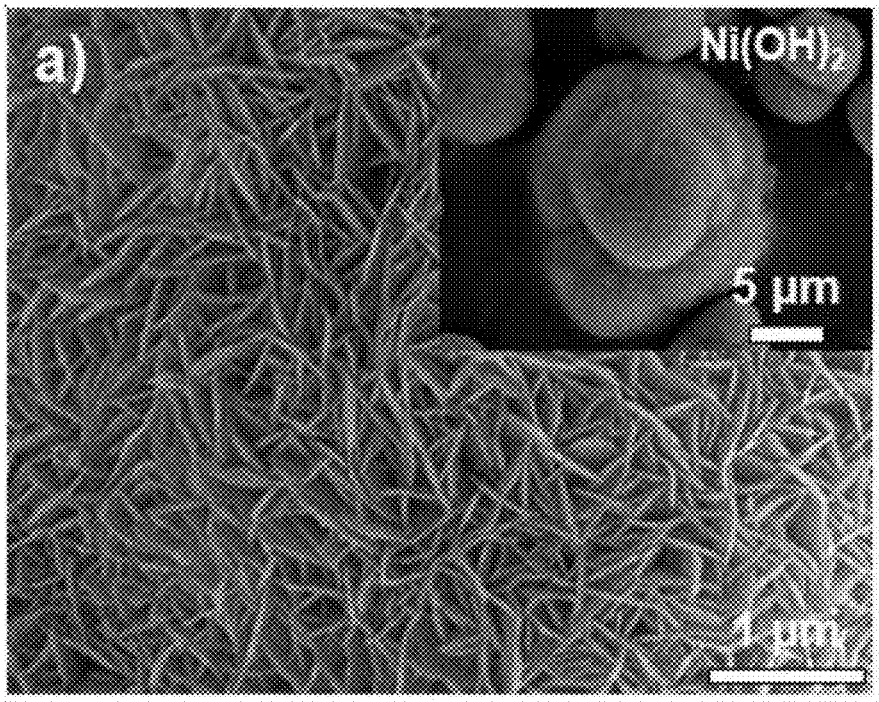
FIGS. 1A and 1B are scanning electron microscope (SEM) images of lithium hydroxide and core-shell precursor prepared in the present disclosure.

Hereinafter, a core-shell structured cathode active material for a lithium secondary battery according to the present disclosure will be described in detail. The following drawings are provided as examples to sufficiently convey the idea of the present disclosure to those skilled in the art. Accordingly, the present disclosure is not limited to the drawings and may be embodied in other foams, and the drawings presented below may be exaggerated to clarify the spirit of the present disclosure. In the flowing description, unless otherwise defined, all terms including technical and scientific terms used herein have the same meaning as commonly understood by those who are ordinarily skilled in the art to which this disclosure belongs. Further, when it is determined that the detailed description of the known art related to the present disclosure might obscure the gist of the present disclosure, the detailed description thereof will be omitted.

The present disclosure provides a cathode active material precursor for a lithium secondary battery, the cathode active material precursor having a core-shell structure that satisfies Formula 1 below and includes a plurality of particles.

$$Ni_xCo_{1-x}(OH)_2 \qquad \text{[Formula 1]}$$

Here, x is a real number satisfying a condition of $0.8 \le x \le 1.0$.

The cathode active material precursor for a lithium secondary battery has a core composition of $Ni(OH)_2$ and a shell composition of $Ni_{0.8}Co_{0.2}(OH)_2$. The present disclosure provides a structure having the core-shell compositions described above so that $Ni^{3+}$ can be stably maintained.

In addition, the present disclosure provides a core-shell structured cathode active material for a lithium secondary battery, the cathode active material being prepared from the cathode active material precursor. The core-shell structured cathode active material features that the core thereof satisfies Formula 2 below and the shell satisfies Formula 3 below, and the core-shell structured cathode active material is doped with an element in Group 13.

$$LiNi_xCo_{1-x}O_2 \text{ (where, } x \text{ is a real number satisfying } 0.9 \le x \le 1.0.) \qquad \text{[Formula 2]}$$

$$LiNi_xCo_{1-x}O_2 \text{ (where, } x \text{ is a real number satisfying } 0.8 \le x \le 0.9.) \qquad \text{[Formula 3]}$$

A method of preparing the cathode active material precursor for a lithium secondary battery will be described in detail below.

The core and shell of the cathode active material for a lithium secondary battery may include primary particles having an average particle diameter in a range of 20 nm to 500 nm. In this case, the core may include primary particles satisfying Formula 2, and the shell may include secondary particles being an aggregation of the primary particles and satisfying Formula 3. Specifically, referring to FIG. 2, the shape and size of the primary particles can be identified from an SEM image having a 1-μm scale bar, and the shape and size of the secondary particles can be identified from an SEM image having a 5-μm scale bar. The secondary particles have an average particle size in the range of from 10 μm to 20 μm.

The cathode active material for a lithium secondary battery may have a trigonal crystal structure.

The cathode active material for a lithium secondary battery, provided by the present disclosure contains a high amount of nickel, and the molar ratio of nickel in each of the core and the shell is 15% by mole or more. The core-shell structure may include a core having a trigonal crystal structure and the formula $LiNi_xCo_{1-x}O_2$ ($0.90 \le x \le 1.00$) and a shell having a trigonal crystal structure and the formula $LiNi_xCo_{1-x}O_2$ ($0.80 \le x \le 0.90$). The core is preferably $LiNiO_2$ and the shell is preferably $LiNi_{0.8}Co_{0.2}O_2$. With this core-shell configuration, it is possible to mitigate problems such as transition metal elution and lattice structure collapse occurring in the cathode of a lithium secondary battery while the number of charging and discharging cycles increase.

The element in Group 13 may be one or more selected from B, Al, Ga, and In. In this case, preferably, the element may be B and Al among the Group 13 elements.

For example, the doping may be performed such that the molar ratio of B to Li may be in a range of 1:0.005 to 0.015 and the molar ratio of Al to Li may be in a range of 1:0.010 to 0.020.

Such doping may be applied to respective materials constituting the core and the shell. Due to the doping, the ratio of $Ni^{3+}$ with respect to the total nickel is in the range of 60% to 90% by mole in the core and is in the range of 70% to 97% by mole in the shell. The elements introduced into the cathode active material through the doping stabilize $Ni^{3+}$, thereby preventing cation mixing frequently occurring in high-nickel cathode active materials. This contributes to an increased lifespan of a battery.

In addition, the doping has an effect of preventing a phenomenon in which a shell component tends to permeate into the core. This will be described in detail below in the section of describing examples.

The core-shell structured cathode active material has a shell thickness in the range of from 300 nm to 1000 nm. Specifically, the shell thickness refers to the thickness of a secondary particle phase and may be determined according to the relative amount of Co atoms in the secondary particles.

In the cathode active material provided in the present disclosure, a gradient may occur in the relative amount of Co atoms according to the distance from the surface to the center of the secondary particle. Specifically, the relative amount of Co atoms has a maximum value in a region corresponding to a thickness range of 300 nm to 1000 nm from the surface of the shell to the center, and then the concentration gradually decreases as it becomes closer to the center. Preferably, the concentration of Co atoms may finally reach 0 in the core-shell structure. As such, when the thickness of the shell is determined according to the relative amount of Co atom, a reference point to determine the boundary between the core and the shell is a may be a point where the relative concentration of Co atoms is 40% or less, preferably 20% or less, and more preferably 10% or less, relative to the maximum value of the Co concentration. When the thickness of the shell is determined according to the relative amount of the Co atoms, the shell thickness of the cathode active material is preferably 300 nm to 1000 nm and more preferably 300 nm to 800 nm.

The core-shell structured cathode active material for a lithium secondary battery may have a $Ni^{3+}$ concentration of 85% or more at a position corresponding to a radial depth of 100 nm or more from the surface of the core-shell structure. Such features can be more clearly understood by referring to FIG. 3 of the present disclosure.

$Ni^{3+}$ is a major factor that enables high capacity and high reversibility in high-nickel cathode active materials. However, $Ni^{3+}$ tends to be reduced to $Ni^{2+}$ because it is chemically unstable. $Ni^{2+}$ has an ionic radius very similar to that of $Li^+$, resulting in a cationic mixing phenomenon in which $Ni^{2+}$ replaces $Li^+$. However, as described above, with the control of the $Ni^{3+}$ concentration such that the molar ratio of $Ni^{3+}$ is as high as 0.7 or more in the active material particle and 0.8 or more in a region distanced by 100 nm or more from the outer surface of the particle, it is possible to prevent the cation mixing.

A method for preparing a cathode active material for a lithium secondary battery having a core-shell structure includes: A) preparing a first solution by mixing a nickel salt compound and an aqueous ammonia solution; B) obtaining nickel hydroxide by adding a basic aqueous solution to the first solution; C) preparing a second solution in which a nickel salt compound and a cobalt salt compound are dissolved, D) preparing a cathode active material precursor for a lithium secondary battery by adding the nickel hydroxide to the second solution; E) preparing a mixed powder by mixing the cathode active material precursor, lithium hydroxide, and a dopant; and F) heat-treating the mixed powder.

The B) step may include a step of drying the nickel hydroxide. In the preparation method of the present disclosure, the nickel hydroxide creation reaction progresses in an aqueous solution phase. Therefore, the components of the aqueous solution can be obtained when nickel hydroxide is obtained. In this case, preferably the D) step may include a step of drying the cathode active material precursor.

The nickel salt compound may be any one selected from sulfate, nitrate, and phosphate. The nickel salt compound acts as a precursor for preparing nickel hydroxide and a precursor for preparing the shell. Most preferably, the nickel salt compound is sulfate. In addition, the nickel salt compound is preferably a hydrate for smooth dissociation and reaction in an aqueous solution, and the hydrate satisfying the conditions described above is $NiSO_4*6H_2O$.

The basic aqueous solution may be a mixed aqueous solution prepared by mixing sodium hydroxide and ammonia. The concentration of sodium hydroxide and ammonia may be in a range of 3 M to 6 M. Specifically, the sodium hydroxide aqueous solution may be used as a source of hydroxide ions as well as a mediator for adjusting the reaction pH. In addition, since sodium has a weak ion binding force with respect to sulfate and thus almost no precipitation of sodium sulfate salt occurs, high-purity nickel hydroxide can be obtained without an additional separation process.

The nickel hydroxide has a low solubility of about 0.0015 g/L in water at room temperature (20° C. to 25° C.). Therefore, nickel hydroxide precipitates in the form of a powder immediately after being synthesized. In this case, since the aqueous solution is a basic aqueous solution, it is preferable to wash and dry the nickel hydroxide.

The cobalt salt compound may be any one selected from sulfate, nitrate, and phosphate. The cobalt salt compound acts as a precursor for preparing the shell. Most preferably, the cobalt salt may be sulfate.

When forming the core-shell precursor, the nickel salt compound and the cobalt salt compound used as the shell precursors are sulfates. In this case, it is possible to prevent the boundary between the core and the shell from becoming unclear, which occurs because the shell precursors are mixed with the core cursor, $Ni(OH)_2$.

The dopant may include one or more elements selected from B, Al, Ga, and In. The dopant to be introduced into the cathode active material may be selected from Group 13 elements. Preferably, B and Al are used as the dopant as described above.

The heat treatment may be performed at a temperature in the range of from 300° C. to 500° C. for a duration in the rage of from 1 hour to 4 hours. It is possible to remove residual moisture and impurities from the material by performing the heat treatment under such conditions. After the heat treatment, a secondary heat treatment may be performed for a duration in the range of 8 hours to 20 hours at an elevated temperature in the range of from 600° C. to 900° C.

The secondary heat treatment may be performed at a temperature in the range of from 300° C. to 900° C. for a duration in the rage of from 8 hour to 20 hours. The secondary heat treatment performed under the conditions described above causes the core-shell structured cathode active material to be sintered. This increases the particle density and makes the secondary particles have a particle diameter in the range of from 12 μm to 20 μm. Preferably, the secondary heat treatment may be performed at 600° C. to 800° C. and more preferably at 600° C. to 700° C.

The present disclosure may include a lithium secondary battery cathode including the core-shell structured cathode active material or may include a lithium secondary battery including the lithium secondary battery cathode.

The cathode for a lithium secondary battery may include a cathode active material, a conductive material, a binder, and a cathode current collector.

The conductive material is used to impart conductivity to the electrode. Therefore, the conductive material is required to have excellent chemical stability and be electronically conductive. Specific examples of the conductive material include carbon-based materials such as graphite, carbon black, Super-P, acetylene black, Ketjen black, channel black, furnace black, lamp black, summer black, carbon fiber, carbon nanotubes, carbon nanowires, graphene, graphite mesocarbon microbeads, fullerene, and amorphous carbon; metal powders or metallic fibers made of copper, nickel, aluminum, and silver; conductive whiskers made of zinc oxide and potassium titanate; conductive metal oxides such as titanium oxide; and conductive polymers such as poly-phenylene derivatives. Any one material or a combination of two or more materials selected from the specific examples may be used, but the choice of the conductive material may not be limited thereto.

The binder is an adhesive for bonding the cathode active material, the conductive material, and the cathode collector to each other. Specific examples of the binder include, but are not limited to, polyvinylidene fluoride (PVdF), polyimide (PI), fluoropolyimide (FPI), polyacrylic acid (PAA), polyvinylalcohol (PVA), carboxymethylcellulose (CMC), starch, hydroxypropyl cellulose, regenerated cellulose, poly-vinylpyrrolidone (PVP), tetrafluoroethylene (PTFE), poly-ethylene, polypropylene, polyurethane, ethylene-propylene-diene polymer (EPDM), sulfonated ethylene-propylene-diene polymer (S-EPDM), styrene-butadiene rubber (SBR), fluorine rubber, copolymers thereof, and algin. One or more materials selected the examples as the binder, but the binder is not limited thereto.

The cathode current collector may provide an electrical passage between the cathode active material and a power supply. The cathode current collector may be made of aluminum or aluminum mesh.

The lithium metal battery includes the cathode, an anode, an electrolyte, and a separator.

The anode includes an anode active material and an anode current collector.

The anode active material may be a medium for reducing lithium ions into lithium and storing lithium. The anode active material may be any one selected from the group consisting of: carbon-based materials such as natural graph-ite, artificial graphite (MCMB, etc.), hard carbon, and soft carbon; silicon-based materials such as silicon, silicon car-bon complex, silicon oxide (SiO, $SiO_x$), silicon oxide carbon complex, silica, and silicate; and metal-based materials such as lithium metal, $Li_4Ti_5O_{12}$, and metal oxides (metal is Ti, V, Cr, Mn, Fe, Co, Ni, Nb, Mo, W, or the like). However, the anode active material is not limited to the examples described above, and any material known to be able to be used as an anode active material can be used without limitation.

Since the binder and the conductive material used for the anode are the same as in the case of the cathode, a redundant description will not be given here.

The current collector for the anode has the same function and configuration as the current collector for the cathode. Specifically, the current collector for the anode may be made of copper.

The anode current collector provides an electrical passage between the anode active material and a power supply. The anode current collector may be made of copper processed into copper clad or copper mesh.

The electrolyte may be a lithium salt, a mixed organic solvent containing a lithium salt, a polymer matrix, or a solid-state electrolyte.

The lithium salt comprises any one or a mixture of two or more selected from the group consisting of $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiC_6H_5SO_3$, LiN $(C_2F_5SO_3)_2$, LiN $(C_2F_5SO_2)_2$, LiN $(CF_3SO_2)_2$, $LiN(FSO_2)_2$, LiN $(C_xF_{2x+1}SO_2)$ $(C_yF_{2y+1}SO_2)$ (herein, x and y are each 0 or natural number) LiCl, LiI, LiSCN, $LiB(C_2O_4)_2$, $LiF_2BC_2O_4$, $LiPF_4$ $(C_2O_4)$ $LiPF_2$ $(C_2O_4)_2$, and $LiP(C_2O_4)_3$. However, the lithium that can be used is not limited to the examples.

The mixed organic solvent may be any one or a mixture of two or more selected from: a cyclic carbonate group including ethylene carbonate, propylene carbonate, and vinylene carbonate; a fluorinated cyclic carbonate group including fluoroethylene carbonate, difluoroethylene car-bonate, and fluoropropylene carbonate; and a linear carbon-ate group including dimethyl carbonate, methyl ethyl car-bonate, and diethyl carbonate. However, the mixed organic solvent is not limited to the examples.

In the electrolyte that is made of a mixed organic solvent containing a lithium salt, the concentration of the electrolyte may be adjusted to a level commonly used in the art. Specifically, for example, the concentration of a lithium salt may be in the range of from 0.1 M to 60 M and more preferably in the range of from 0.5 M to 2 M.

The mixed organic solvent may further include an addi-tive.

The additive plays a role of directly forming or assisting the formation of cathode-electrolyte interface (CEI) or solid-electrolyte interface (SEI), removing active materials such as HF and $PF_5$, preventing overcharging, improving flame retardancy, uniformizing reduction and deposition of lithium. reducing the solvation energy of ions, and prevent-ing corrosion of a current collector. Any material previously known for these purposes in the art can be used without limitation.

The content of the additive may be adjusted within the range of from 0.01% to 10% by weight, depending on the desired physical properties.

The electrolyte may include a polymer electrolyte matrix to improve mechanical physical properties or high tempera-ture stability of battery cells. Specifically, the polymer electrolyte matrix may be any one or a mixture of two or more selected from the group consisting of polyacrylate, polymethacrylate, polyvinyledene fluoride (PVDF), poly-hexafluoro propylene (PHFP), polyethylene oxide (PEO), polypropylene oxide (PPO), polydimethyl siloxane, poly-acrylonitrile, polyvinyl chloride (PVC), PEGDME, and copolymers thereof. Any polymer that is known to have applications related to a lithium secondary battery can be used without limitation.

The polymer matrix may include crosslinking units.

The solid-state electrolyte is a composite of the polymer matrix and the lithium salt. The components of the solid-state electrolyte are the same as the components of the polymer matrix and the lithium salt. Therefore, a duplicate description will be omitted.

For the separator, any form that is commonly known in the art can be used without limitation. Specific examples of the separator include: a porous polyolefin thin film such as polyethylene and polypropylene; a non-woven fabric made of polymeric fibers such as polyacrylate and polyacryloni-trile; and a porous polyolefin thin film coated with a ceramic coating layer.

However, in the case where the electrolyte includes a polymer, has a thin film form and has physical properties by which the cathode and the anode can be isolated from each other, the separator may not be included.

The lithium secondary battery may be characterized in that the capacity retention rate calculated according to Equation 1 is 90% or more after 100 charge/discharge operations and 85% or more after 150 charge/discharge operations.

> Capacity retention rate (%) for $n$ cycles of charging and discharging=(capacity for $n$-th discharging operation/capacity for first discharging operation)×100      [Equation 1]

Hereinafter, the core-shell structured cathode active material according to the present disclosure and a lithium secondary battery including the same will be described in greater detail with reference to examples. However, the examples described above are presented only for illustrative purposes and are intended to limit the present disclosure. The present disclosure can be embodied in other forms in addition to the forms presented by the examples.

In addition, unless otherwise defined, all technical and scientific tams have the same meaning as that is generally understood by the ordinarily skilled in the art to which the present disclosure pertains. The terms used in the description of the specification of the present application are only intended to effectively describe specific examples and are not intended to limit the present disclosure. Unless otherwise stated herein, the units of the amounts of additives may be % by weight (wt %)

Preparation of Nickel Hydroxide

5 L of 1.5 M $NiSO_4*6H_2O$ was introduced into a $N_2$-ambient continuous stirred-tank reactor (CSTR) filled with 1.5 M $NH_3*H_2O$. Next, 4.0 M of an aqueous NaOH solution and 4.8 M of $NH_3*H_2O$ as chelating agent were introduced into the CSTR, and stirred. In this case, during the reaction, the inside of the CSTR was maintained at a pH of 11.2±02, a temperature of 50° C., and a stirring rate of 800 rpm. Next, $Ni(OH)_2$ obtained in powder form was then washed and dried.

Preparation of Core-Shell Precursor $NiSO_4*6H_2O$ and $CoSO_4*7H_2O$ were added to $Ni(OH)_2$ to prepare an aqueous solution, and mixing and stirring were continuously performed to prepare a precursor represented by $Ni(OH)_2$—$Ni_{0.8}Co_{0.2}(OH)$. The precursor represented by $Ni(OH)_2$—$Ni_{0.8}Co_{0.2}(OH)_2$ was neutralized with distilled water and dried at a temperature of 80° C. for 24 hours.

Preparation of Core-Shell Structured Cathode Active Material $LiOH*H_2O$, $Ni(OH)_2$—$Ni_{0.8}Co_{0.2}(OH)_2$ as a precursor, $B(OH)_3$, and $Al(OH)_3$ were mixed in a molar ratio of 1.02:0.975:0.015:0.01, and the mixed powder was ground. The powder was primarily heat-treated at a temperature of 400° C. for 2 hours and secondarily heat-treated at a temperature of 720° C. for 12 hours in an $O_2$ atmosphere to produce a lithium secondary battery cathode active material having a core-shell structure having a chemical formula of $LiNiO_2$—$LiNi_{0.8}Co_{0.2}O_2$.

Example 1

A lithium secondary battery cathode active material having a core-shell structure having a formula of $LiNiO_2$—$LiNi_{0.8}Co_{0.2}O_2$ was used.

Example 2

In the same manner as in Example 1, a cathode active material for a lithium secondary battery was prepared, and the temperature of the secondary heat treatment was adjusted to 600° C.

Comparative Example 1

A lithium secondary battery cathode active material represented by $LiNiO_2$—$LiNi_{0.8}Co_{0.2}O_2$ was prepared. This material had the same core-shell structure as in Example 1 but contained neither B nor Al as a dopant.

Comparative Example 2

Instead of the core-shell precursor, $Ni(OH)_2$ was mixed with $LiOH*H_2$, O, B, and Al and crushed. Next, heat-treatment was performed under the same conditions as in the examples. As a result, a lithium secondary battery cathode active material represented by $LiNiO_2$ was obtained.

Comparative Example 3

A cathode active material represented by $LiNiO_2$, having the same structure as in Comparative Example 2, and containing neither B nor Al was prepared.

Method of Characterization

A. Observation of Morphology and Particle of Cathode Active Material

The nickel hydroxide, the core-shell precursors, and the cathode active materials prepared according to the examples and the comparative examples were observed under a scanning electron microscope (SEM).

Figure 1B:
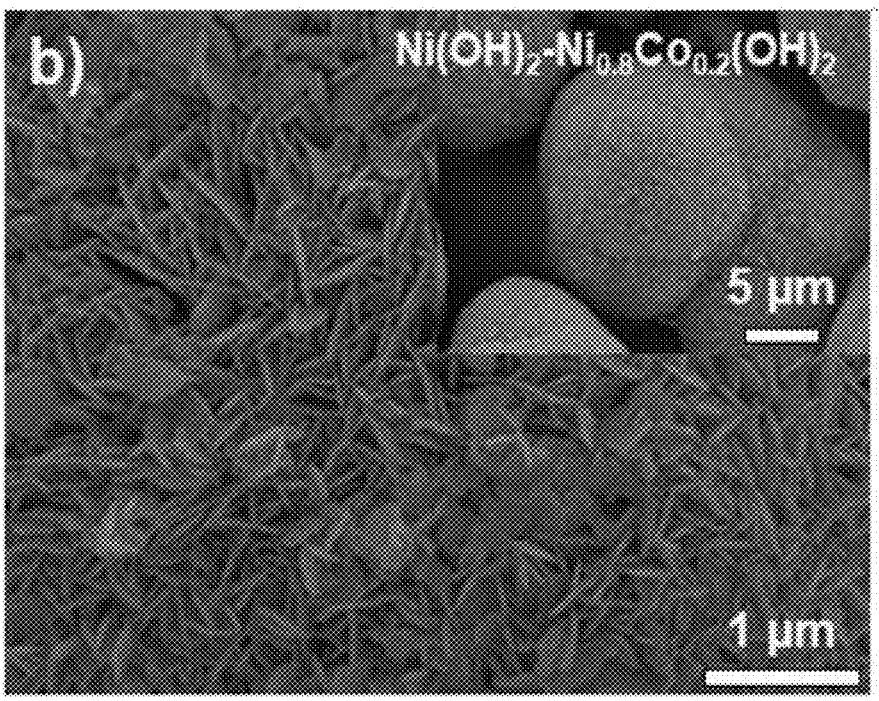
Figure 1C:
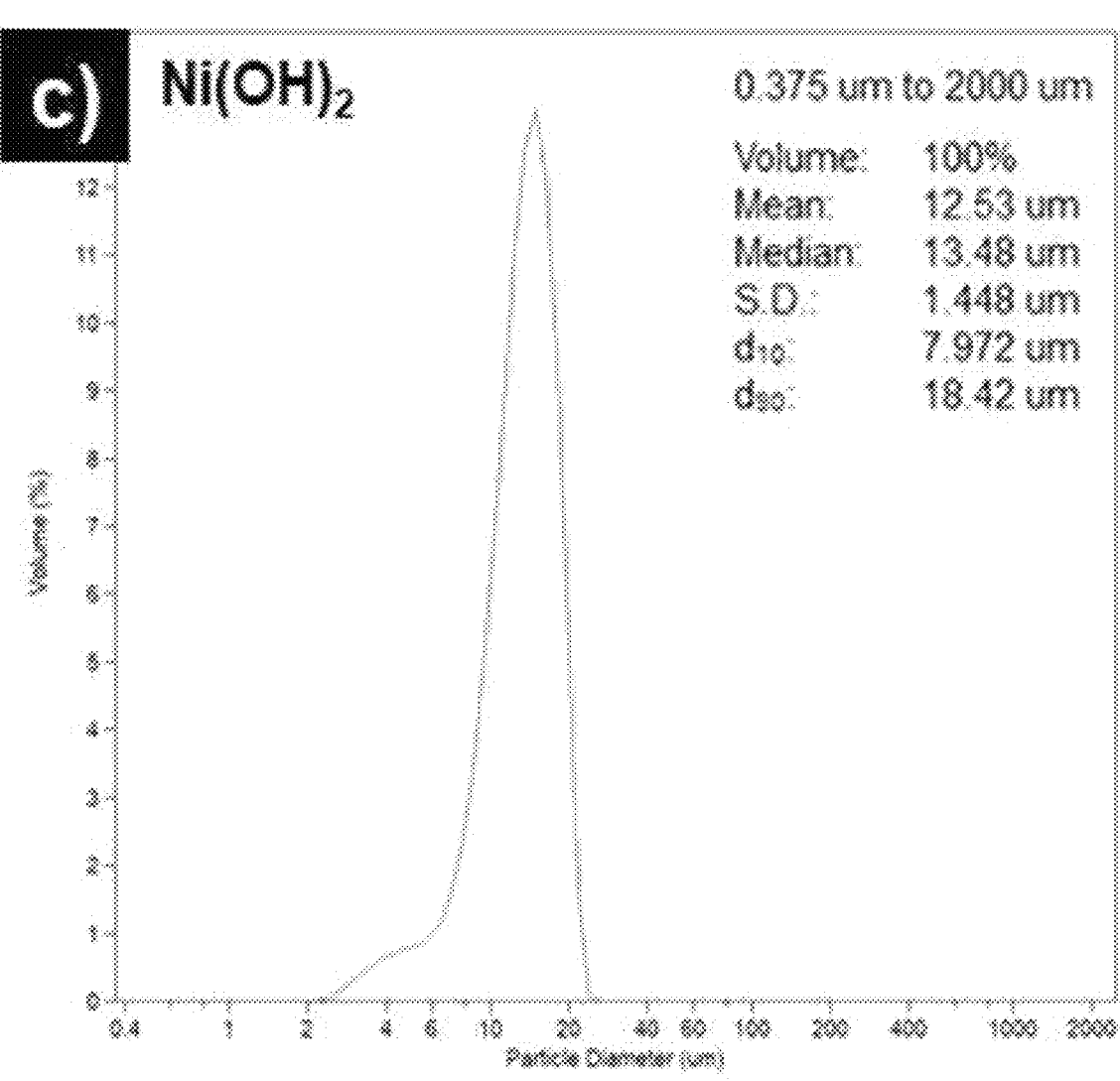
FIGS. 1C and 1D are pictures showing the particle size distribution of the lithium hydroxide and the core-shell precursor prepared in the present disclosure.
Figure 1D:
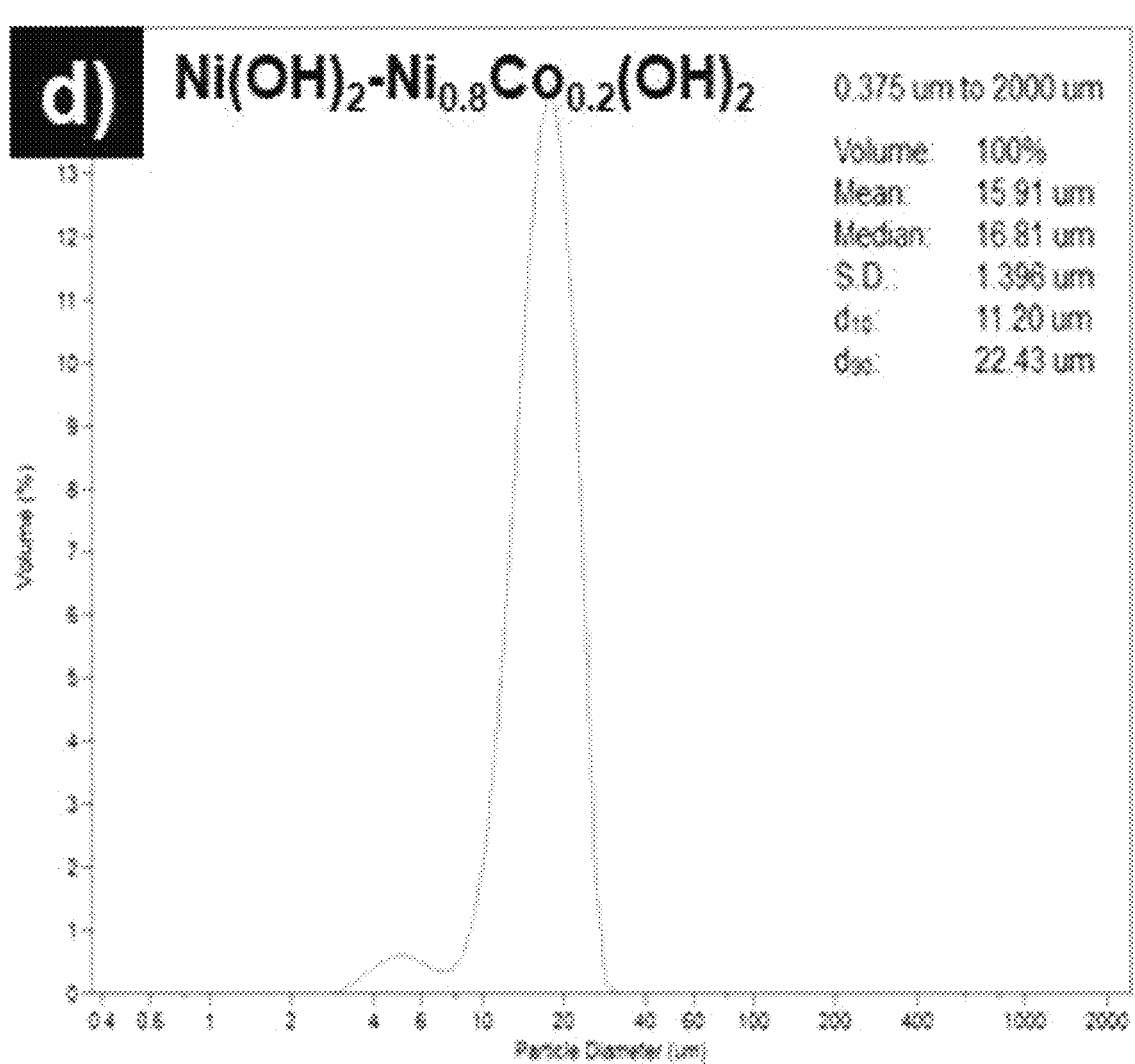

Referring to FIGS. 1A to 1D, the particles of the nickel hydroxide and the core-shell precursors can be visually identified. FIG. 1A and FIG. 1B illustrate the nickel hydroxide and the core-shell precursor, respectively, and FIG. 1C and FIG. 1D illustrate the particle size distributions of the nickel hydroxide and the core-shell precursor, respectively.

Figure 2A:
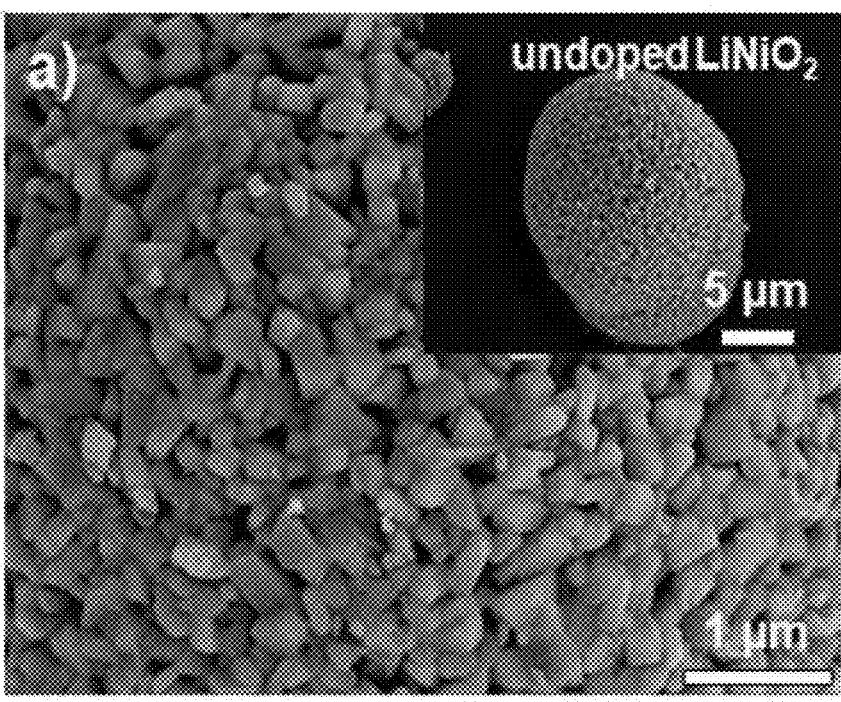
FIGS. 2A, 2B, and 2C are SEM images of materials of comparative examples
Figure 2B:
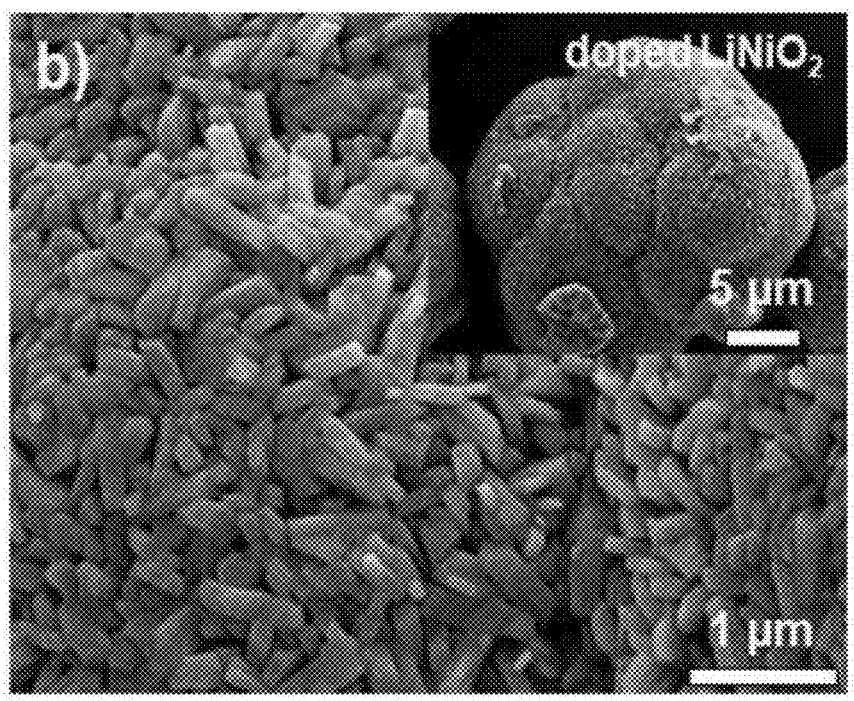
Figure 2C:
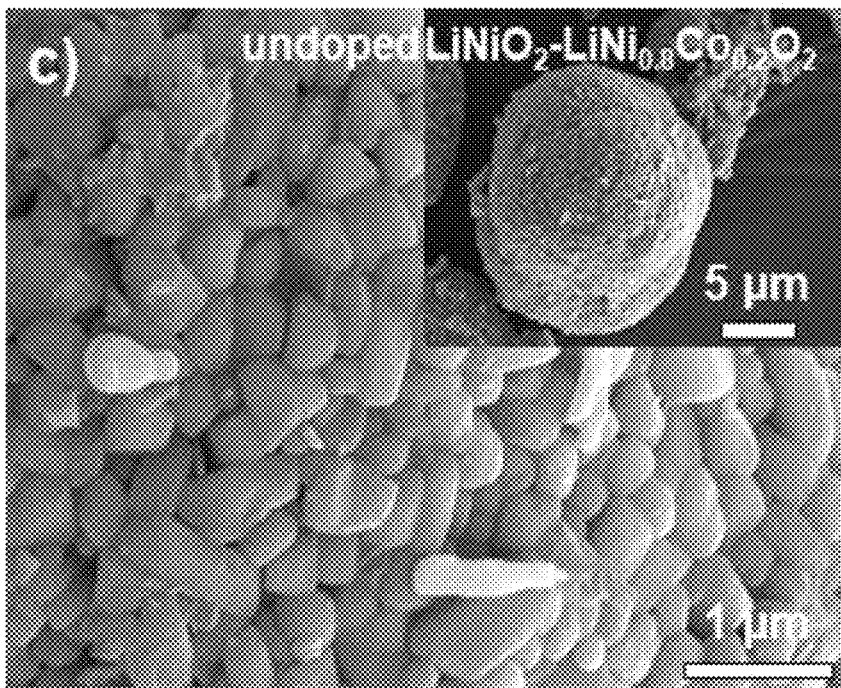
Figure 2D:
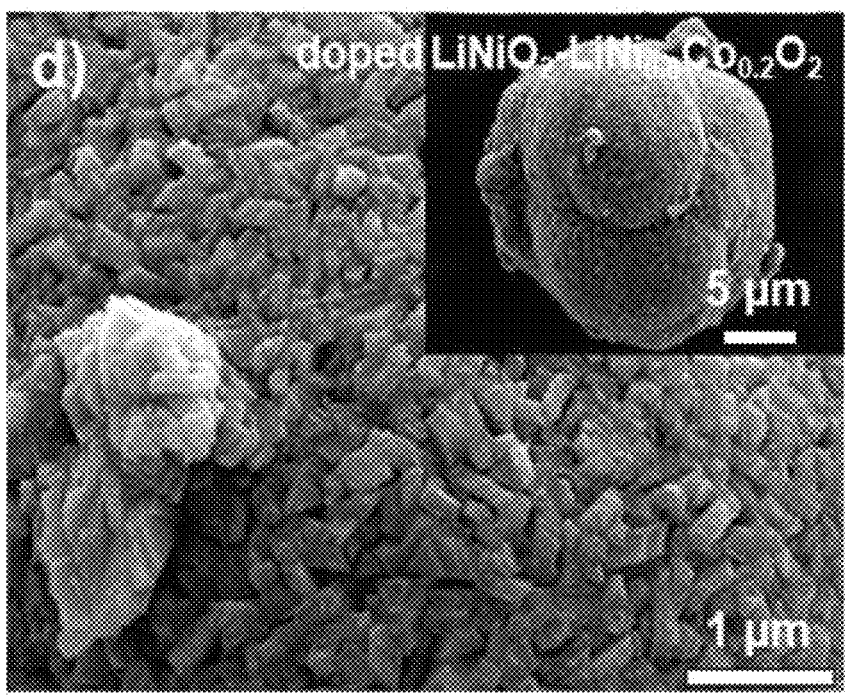
FIG. 2D is an SEM image of a material prepared according to Example 1 of the present disclosure.

Referring to FIG. 2A to 2D, the particles of Example 1 and Comparative Example can be visually identified. Referring to FIG. 2A, $LiNiO_2$ particles of Comparative Example 3 have an overall rounded shape compared to $Ni(OH)_2$ particles and are aggregated to have a spherical shape. Referring to FIG. 2B, it can be seen that the particles of Comparative Example 2 have a bar-like shape in contrast with the particles of Comparative Example 3. The length of the particles is similar to that of the particles of Comparative Example 2, but the width of the particles is reduced, so that the sizes of the particles are overall reduced. Referring to FIG. 2C, it can be seen that the particles of Comparative Example 1 ($LiNiO_2$—$LiNi_{0.8}Co_{0.2}O_2$) are larger than the particles of Comparative Examples 2 and 3. Lastly, referring to FIG. 2D, the particles of Example 1 are smaller and are more densely arranged than the particles of Comparative Example 1.

B. Observation of Nickel Ionization on Surface of Cathode Active Material

The surfaces of the particles of Comparative Example 2 and Example 1 were observed, and the ratio of trivalent nickel ions ($Ni^{3+}$) in the cathode active material was measured.

Figure 3A:
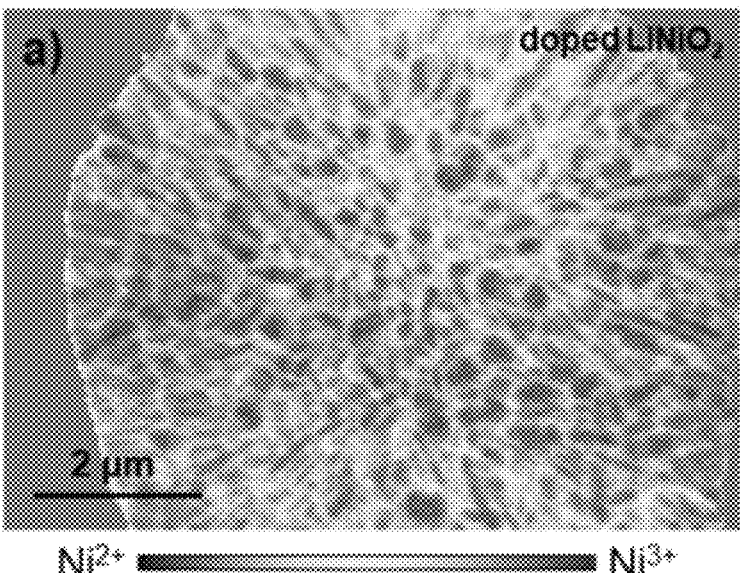
FIG. 3A and FIG. 3B are visual representations of $Ni^{3+}$ concentrations for the material prepared according to Example 1 (FIG. 3A) of the present disclosure and the material prepared according to Comparative Example 2 (FIG. 3A)
Figure 3B:
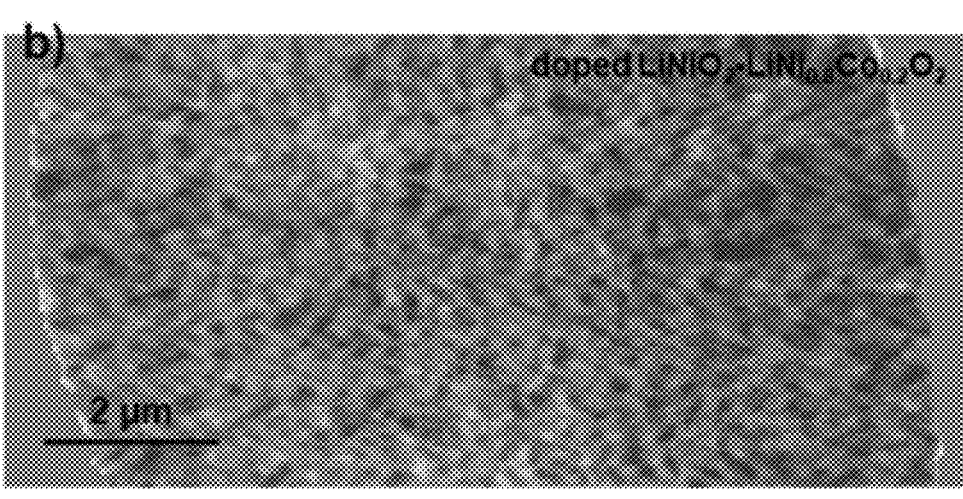
Figure 3B:
Figure 3C:
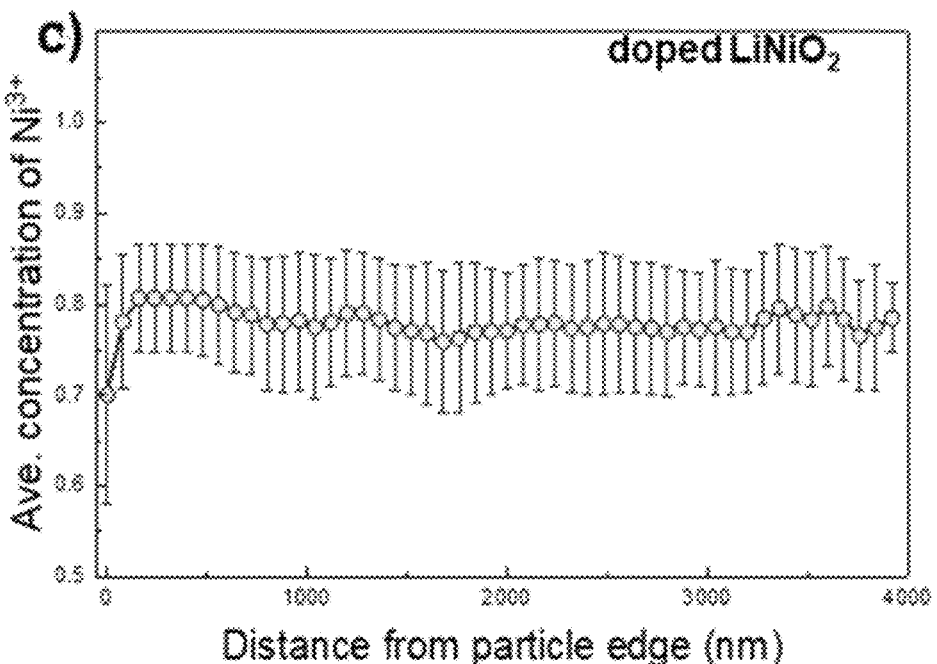
FIGS. 3C and 3D are views illustrating the radial concentration gradients from the surface to the center.
Figure 3D:
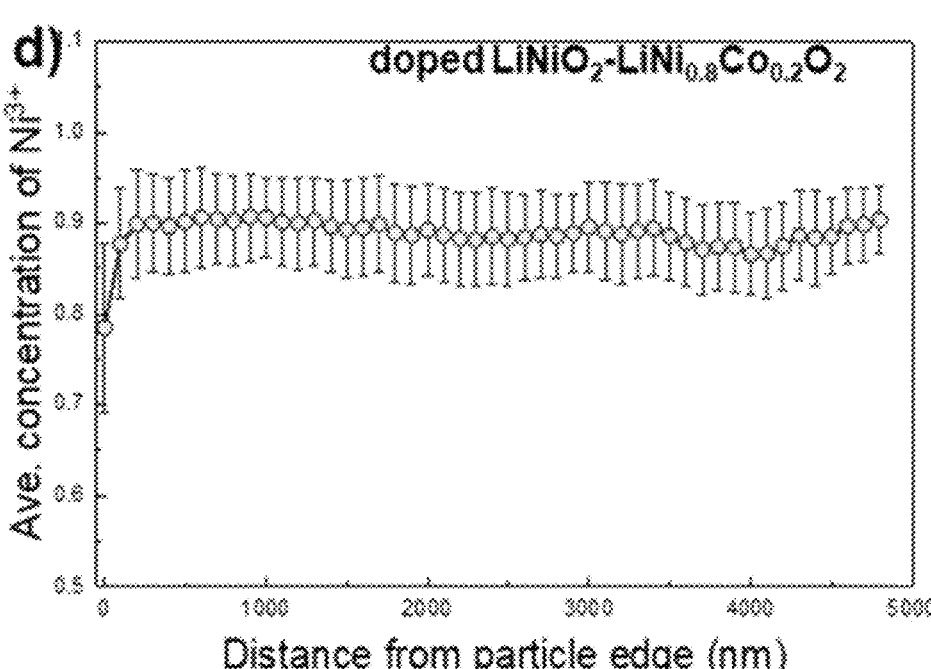

Referring to FIG. 3A, in the case of Comparative Example 2, an average molar ratio was about 0.7 in a crust portion of the particle, and it was about 0.8 in a deeper position. Referring to FIG. 3B, an average molar ratio was about 0.8 in a crust portion and was about 0.9 in a deeper position. That is, due to the implantation of B and Al, the content of trivalent nickel ions ($Ni^{3+}$) in the core-shell structured cathode active material increased.

In lithium secondary batteries, a cation mixing phenomenon occurs in which divalent nickel ions ($Ni^{2+}$) having a similar ionic radius to lithium ions push the lithium ions outward (i.e., toward the surface). In this case, since the trivalent nickel ions ($Ni^{3+}$) is unstable, it is difficult for the trivalent nickel ions to be present in a large amount, and the trivalent nickel ions tend to reduce to divalent nickel ions ($Ni^{2+}$). However, in the case of Example 1, observing that the number of $Ni3^{+}$ ions increased, it can be seen that B and Al introduced into the cathode active material help $Ni^{3+}$ be stabilized.

C. Analysis of Core-Shell Structure of Cathode Active Materials

Figure 5:
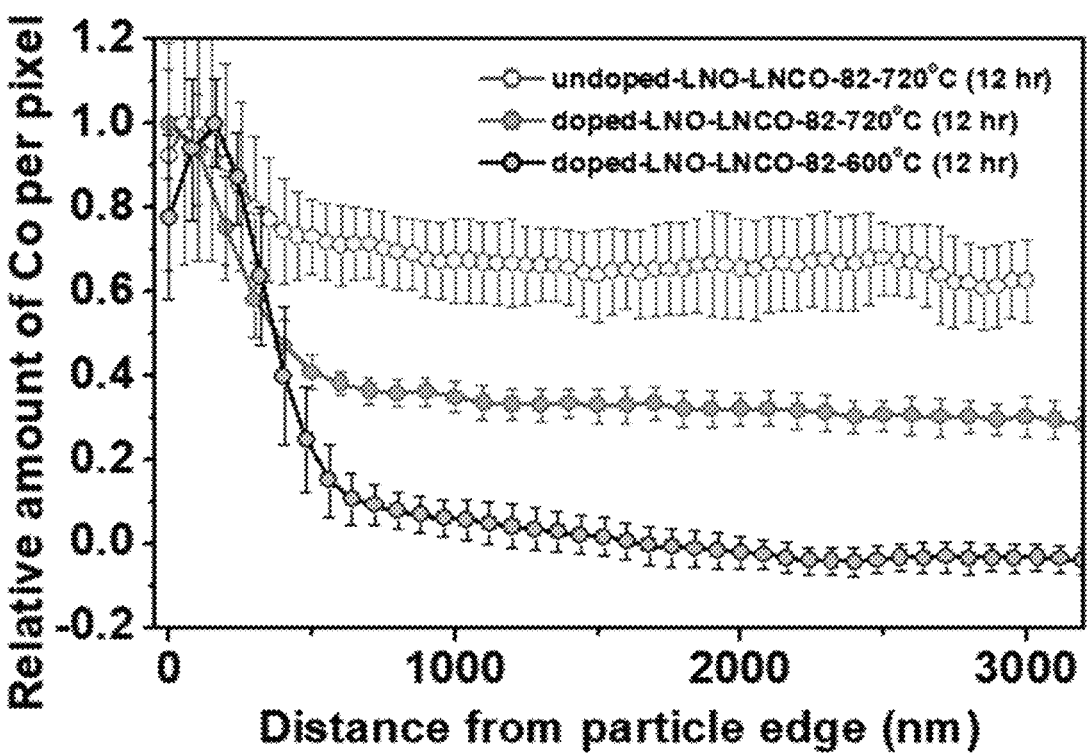
FIG. 5 is a graph illustrating the relative amount of Co according to the distance from the particle surface, measured through X-ray absorption spectroscopy for the core-shell structures of Comparative Example 1 and Example 1 and 2 of the present disclosure.

In FIG. 5, a green graph denoted undoped-LNO-LNCO-82-720° C. relates to Comparative Example 1, a red (pink) graph denoted doped-LNO-LNCO-82-720° C. relates to Example 1, and a black (grey) graph denoted doped-LNO-LNCO-82-600° C. relates to Example 2. Each of the graphs shows a relative amount of Co atoms over the radius range of a corresponding cathode active material, from the surface to the center.

Referring to FIG. 5, in the case of Comparative Example 1, the relative amount of Co atoms is still significantly large (as large as 0.6) even at a position distanced by 3000 nm from the surface. That is, in Comparative Example 1, the core-shell interface is clearly visually identified, but referring to FIG. 5, the composition of the core-shell structure is not completely distinguishable.

On the other hand, in the case of Example 1, it can be seen that the gradient of the relative Co amount becomes relatively gentle at a distance of 500 nm and the relative Co amount gradually decreases from there. In the case of Example 2, the gradient becomes at a distance of 500 nm from the surface, and the relative Co amount gradually until reaching a distance of 250 nm and then converges to zero.

Co is a component of the shell. In the case of Example 1 in which doping was not performed, Co was detected even in the core. This means that the shell component infiltrates into the core. It can be seen, on the other hand, that in the case of Examples 1 and 2, the relative Co amount decreases toward the core from the surface of the shell. This means that Al and B introduced as dopants prevented the shell component from infiltrating into the core.

D. Battery Performance Assessment

Lithium secondary batteries were manufacturing using the cathode active materials of Example 1 and Comparative Examples 1 to 3. FIG. 4 illustrates the discharge capacity of each lithium secondary battery. Example 1, Comparative Example 1, Comparative Example 2, and Comparative Example 3 are denoted as doped LNO-LNCO-82, LNO-LNCO-82, LNO, and LNO, respectively. In this case, the charging and discharging of the lithium secondary batteries were performed with a voltage range of 2.7 to 4.3 V.

Figure 4A:
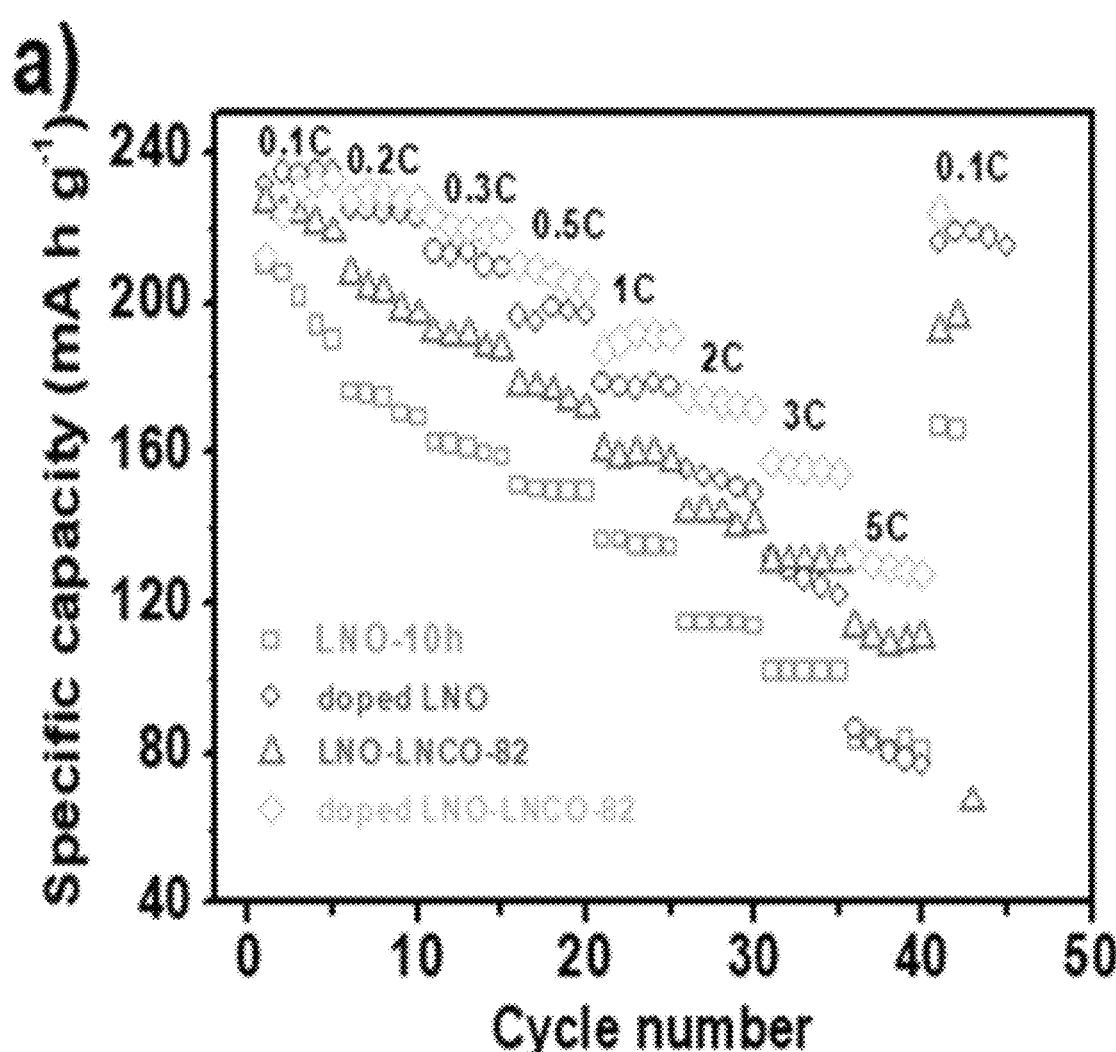
FIG. 4A is a graph illustrating capacity changes of lithium secondary batteries including the materials prepared according to an example and a comparative example of the present disclosure when the C-rate is adjusted.

Referring to FIG. 4A, a change in specific capacity can be identified for the case where the C-rate test is performed in a range of 0.1 to 5.0 C. In the case of Comparative Example 3, a specific capacity up to 5.0 C was particularly low. Even when returning to 0.1 C, the initial capacity was not restored. Comparative Example 1 showed overall a higher specific capacity than Comparative Example 3 but shows a similar behavior. In the case of Comparative Example 2, the overall capacity was higher than those of Comparative Examples 1 and 3. However, the specific capacity reduction rate sharply decreased at a high rate (2.0 C or higher). However, when the rate returned to 0.1 C, the specific capacity was restored to a similar level to the initial capacity. On the other hand, Examples exhibited higher overall capacity and smaller capacity reduction rate than Comparative Examples, and exhibited a recovery to a similar level to the initial capacity when the rate is returned to 0.1 C. From these results, it is seen that the core-shell structure has excellent stability in low-rate charging and discharging but is somewhat disadvantageous in high-rate charging and discharging. It is also seen that the disadvantage can be overcome through B and Al doping.

Figure 4B:
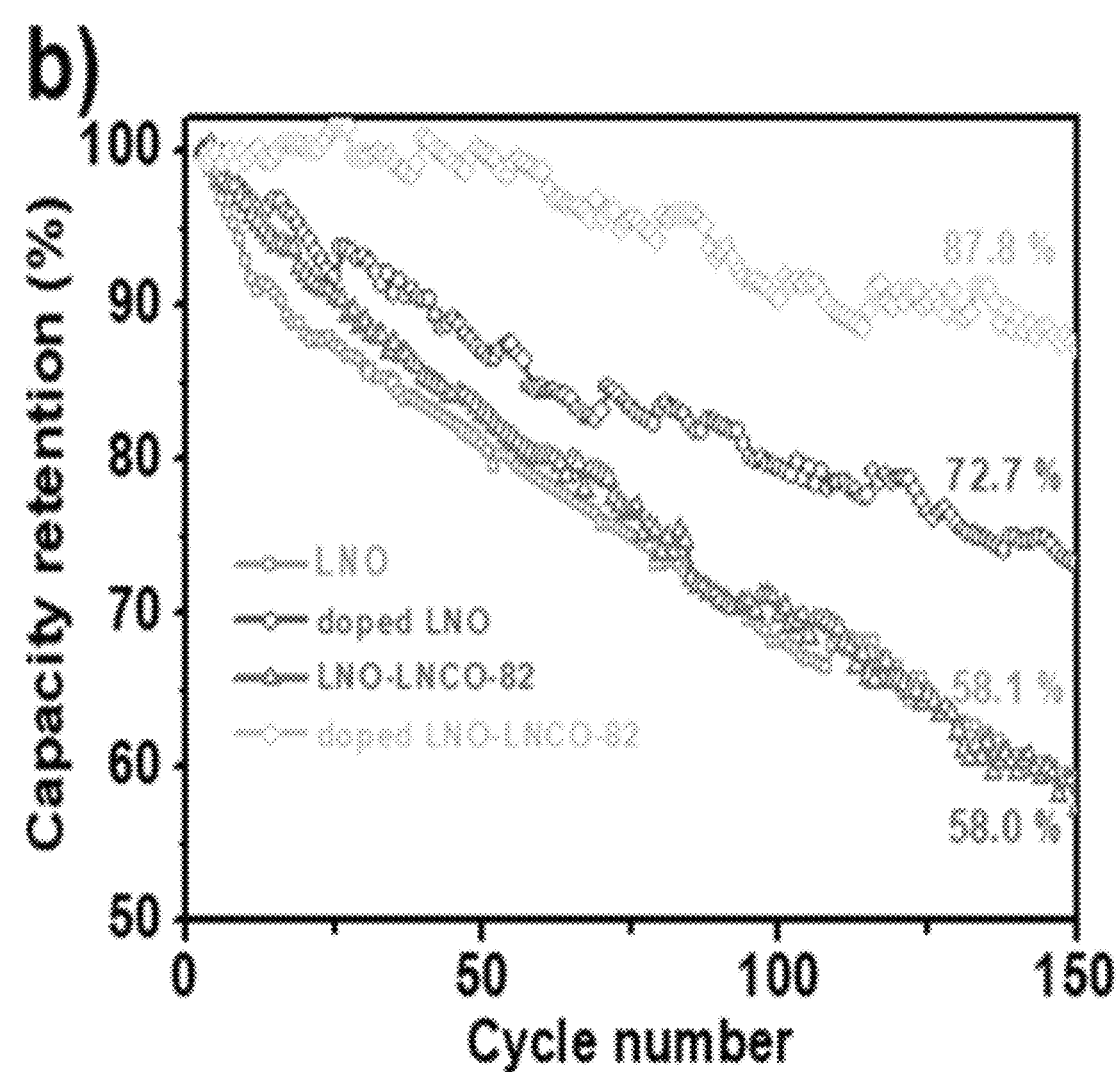
FIG. 4B is a graph illustrating changes in capacity retention rate according to the number of cycles.

Referring to FIG. 4B, the capacity retention rate (change in discharge capacity with respect to initial capacity) is visually shown for each of Example 1 and Comparative Examples 1 to 3 when each of the batteries is charged and discharged by 150 cycles at the same C-rate.

Comparative Examples 1 and 3 show that the capacity retention rate linearly decreases immediately after the first cycle of charging and discharging, resulting in 58.0% and 58.1% respectively at 150 cycles, and Comparative Examples 2 show a slightly improved capacity retention rate of 72.7% at the same cycles On the other hand, Example 1 shows that there is little reduction in capacity retention rate up to about 50 cycles and that the capacity retention rate at 150 cycles is as high as 87.8%. The present disclosure has been described with reference to the limited details and specific examples above. The present disclosure has been provided to aid in the overall understanding of the invention. The present disclosure is not limited to the above examples, and it will be apparent that those skilled in the art could make various modifications and changes to the examples.

Therefore, the spirit of the present disclosure is not limited to the specific examples described above, and all forms defined by the appended claims and all equivalents and modifications thereto fall within the scope of the present disclosure.

What is claimed is:

1. A core-shell structured cathode active material for a lithium secondary battery comprising a core satisfying Formula 2 below and a shell satisfying Formula 3 below, wherein the cathode active material of the core-shell structure is doped with a Group 13 element:

$$LiNi_xCo_{1-x}O_2 \text{ where, } x \text{ is a real number satisfying } 0.9 \leq x \leq 1.0; \qquad \text{[Formula 2]}$$

$$LiNi_xCo_{1-x}O_2 \text{ where, } x \text{ is a real number satisfying } 0.8 \leq x \leq 0.9, \qquad \text{[Formula 3]}$$

wherein the shell has a thickness in a range of 300 nm to 1000 nm, and at a position having a depth of 100 nm from an outer surface of the shell, nickel in the shell comprises $Ni^{3+}$ in an amount of 85% or greater based on a total amount of nickel present at the depth.

2. The cathode active material of claim 1, wherein the cathode active material has a nickel content in a range of 15% to 25% by mole.

3. The cathode active material of claim 1, wherein the core-shell shell has a trigonal crystal structure.

4. The cathode active material of claim 1, wherein the Group 13 element is any one or more elements selected from among B, Al, Ga, and In.

5. The cathode active material of claim 4, wherein the cathode active material is doped with B and Al among the Group 13 elements.

6. The cathode active material of claim 5, wherein the cathode active material is doped with B in a B:Li molar ratio of 1:0.005 to 0.015.

7. The cathode active material of claim 5, wherein the cathode active material is doped with Al in an Al:Li molar ratio of 1:0.010 to 0.020.

8. A lithium secondary battery cathode comprising the cathode active material of claim 1.

* * * * *